United States Patent
Boelstler et al.

[11] Patent Number: 6,123,391
[45] Date of Patent: Sep. 26, 2000

[54] ADJUSTABLE TRACK AND SLIDE MECHANISM

[75] Inventors: Richard A. Boelstler, Lake Orion; David R. Arnold, Macomb Township, Macomb County, both of Mich.

[73] Assignee: Breed Automotive Technology, Inc., Lakeland, Fla.

[21] Appl. No.: 09/282,369

[22] Filed: Mar. 31, 1999

[51] Int. Cl.[7] .................................................. B60R 21/00
[52] U.S. Cl. .......................... 297/464; 297/473; 297/483; 297/486; 297/468
[58] Field of Search ................................... 297/464, 468, 297/473, 483, 486

[56] References Cited

U.S. PATENT DOCUMENTS

| | | | |
|---|---|---|---|
| 4,550,933 | 11/1985 | Patterson | 297/473 X |
| 4,571,001 | 2/1986 | Hakansson | 297/486 X |
| 4,573,708 | 3/1986 | Brorsson | 297/483 X |
| 4,611,825 | 9/1986 | Patterson | 297/473 X |
| 4,640,550 | 2/1987 | Hakansson | 297/468 X |
| 4,711,498 | 12/1987 | Adomeit | 297/468 |
| 4,720,147 | 1/1988 | Takada | 297/483 X |
| 4,834,427 | 5/1989 | Takada | 297/483 X |
| 4,861,071 | 8/1989 | Takada | 297/483 X |
| 4,872,704 | 10/1989 | Biller et al. | 297/483 X |
| 5,066,043 | 11/1991 | Tokugawa | 297/486 X |
| 5,393,098 | 2/1995 | Thomas et al. | 297/483 X |
| 5,655,793 | 8/1997 | Isonaga | 297/483 X |

*Primary Examiner*—Peter M. Cuomo
*Assistant Examiner*—Rodney B. White
*Attorney, Agent, or Firm*—Markell Seitzman

[57] ABSTRACT

A height adjuster for use with a seat belt comprising: a track mountable to a structural member of a vehicle in a vertical orientation, the member including a portion of a vehicle seat, the track including a plurality of adjustment holes located along its length, a carrier member, manually movable along the track relatively to the adjustment holes, the carrier member supporting a movable pin, having a top and a bottom. The pin is movable from a first position in which it is disengaged from a selected adjustment hole to a second position in which it is located within the selected adjustment hole. A spring biases the pin in a direction toward the back of the track, and an activating member, operatively connected to the pin, moves the pin out of the selected hole to the selected position. A web guide, adapted to receive the seat belt, is mounted to and movable with the slide member. A thin rib of energy absorbing material is secured to and extends radially about part of the body of the pin and is located in the vicinity of the top and the bottom of the pin and localized portion of the cylindrical length, to prevent the pin from contacting an adjacent portion of the track proximate an adjustment hole.

8 Claims, 11 Drawing Sheets

ADJUSTABLE TRACK AND SLIDE MECHANISM

BACKGROUND AND SUMMARY OF THE INVENTION

The present invention generally relates to adjustment mechanisms that use a track and a carrier that slides upon and is locked to the track. More particularly, the invention relates to an adjustable seat belt web guide.

While the present invention is described in relation to an adjustment mechanism for a seat belt web guide, it is also applicable to other track and carrier (slide) applications. One such other application is as part of a manual adjuster for a vehicle seat.

With regard to seat belt systems, one of the anchor points of a conventional three-point seat belt system is the web guide (also known as a D-ring). In the early designs, the D-ring was mounted at a fixed location on the B or C-pillar of a vehicle. This location basically defines the angle at which the shoulder belt (of the three-point seat belt system) extended across the upper torso of the seated occupant. Often the location of the shoulder belt, on the seated occupant, was less than optimum for most occupants from the $5^{th}$ percentile female to the $95^{th}$ percentile male. Subsequently, the fixed web guide or D-ring was replaced by a height adjuster or a variably positioned web guide (D-ring) thereby overcoming the above-noted deficiency.

A review of the prior art shows that many of these height adjusters, variably positioned D-rings, or adjustable web guides (all of which refer to the same device) utilize a metal track or rail that is adapted to be mounted to the B or C-pillar of the vehicle or, alternatively, to the frame of the seat. This track includes a plurality of locking openings. A carrier is slidably positioned on the track. This carrier includes a lock pin that is movable within a selected one of the openings. The lock pin is withdrawn from one opening by pulling or twisting a knob or other mechanism to disengage the lock pin from the track hole thus permitting the carrier to be pushed or pulled to a different position along the track. Thereafter, the knob is released and the pin is moved, by a bias spring, into the newly selected opening. The web guide, or D-ring, is secured to or part of the movable carrier. As can be appreciated, as the carrier moves (up and down track), the position of the D-ring relative to the seated occupant is varied.

During a vehicle crash, the occupant will, of course, load the shoulder belt. This load must be withstood by the web guide, carrier (or slide), lock pin and track. Typically, the forces that must be withstood are in the range of 300 to 1500 Kg. This requirement is satisfied by utilizing a metal track and a metal lock pin. As can be further appreciated, this construction can generate annoying levels of noise as the metal lock pin impacts the metal track either as the carrier is moved or as the lock pin moves into contact with the track after the knob is released.

U.S. Pat. No. 4,720,147 provides one solution to lessen the level of noise by machining a groove near the tip of a cylindrical lock pin. This groove forms a flange proximate the tip end of the lock pin. A plastic split ring is placed within the groove, about the lock pin, to provide some degree of energy dissipation between the lock pin and the track. One deficiency in this type of design is that the split ring is susceptible, over time, of becoming dislodged from the lock pin or broken and falling off losing its ability to dampen the objectionable noise. Additionally, a dislodged split ring could impede the movement of the carrier.

It is an object of the present invention to provide an improved height adjusting mechanism.

Accordingly the invention comprises: a mechanism such as a height adjuster for use with a seat belt comprising: a track or rail mountable to a structural member of a vehicle in a vertical orientation, the member including a portion of a vehicle seat, the track including a plurality of adjustment holes located along its length, a carrier member, manually movable along the track relative to the adjustment holes, the carrier member supporting a movable lock pin, having a top and a bottom. The lock pin is movable from a first position in which it is disengaged from a selected adjustment hole to a second or engaged position in which it is located within the selected adjustment hole. A spring biases the lock pin in a direction toward the track (or rail), and an activating member, such as knob, operatively connected to the lock pin, moves the lock pin out of the selected hole to the first or disengaged position. A web guide, adapted to receive the seat belt, is mounted to, and movable with the slide member. A thin rib of energy absorbing material is secured to and extends radially about part of the body of the lock pin and is located in the vicinity of the top and the bottom of the lock pin, to prevent the lock pin from contacting an adjacent portion of the track proximate an adjustment hole.

Many other objects and purposes of the invention will be clear from the following detailed description of the drawings.

DETAILED DESCRIPTION OF THE DRAWINGS

Figure 1:
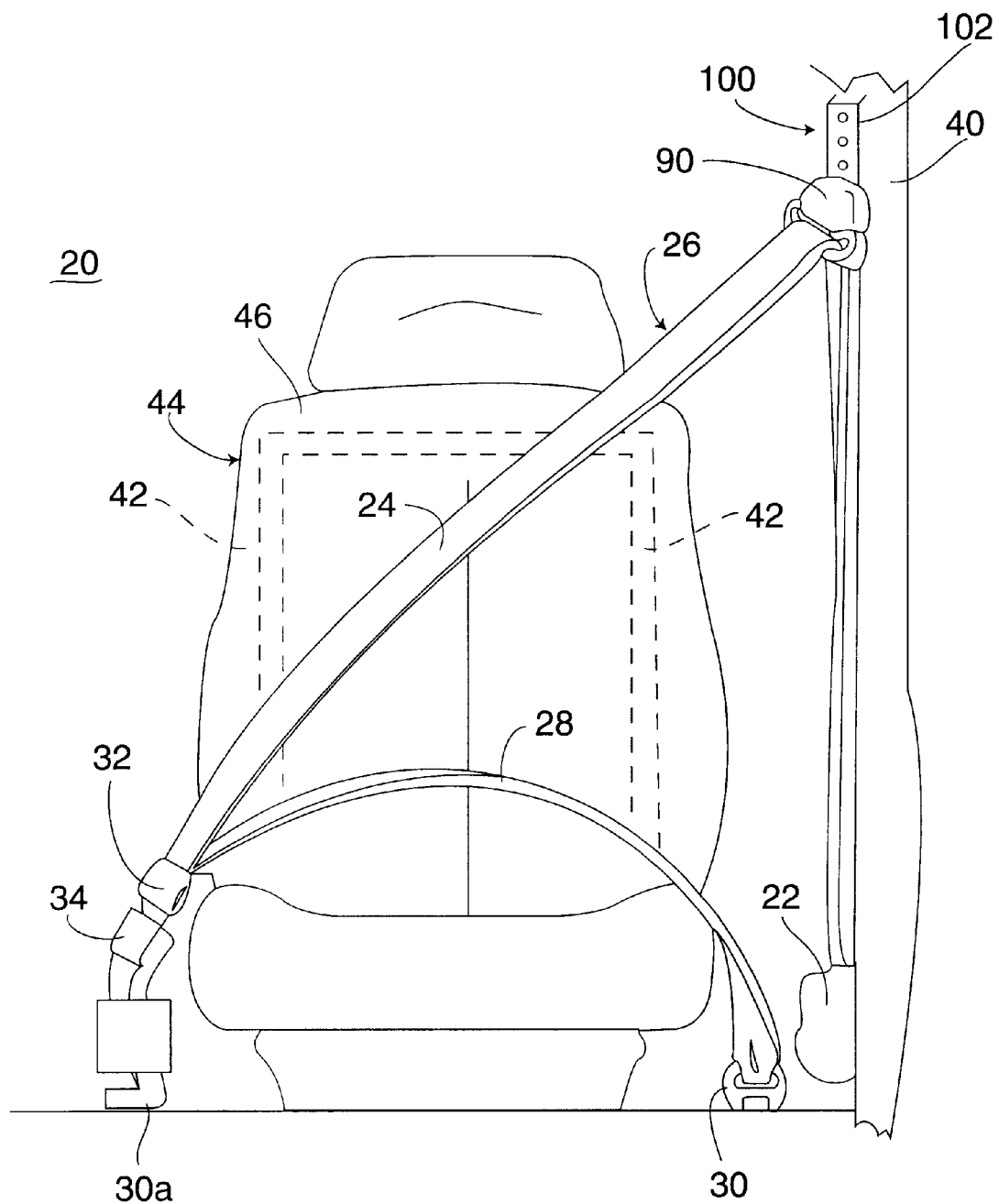
FIG. 1 illustrates a typical three-point seat system.

FIG. 1 shows a typical three-point seat belt system 20 comprising a retractor 22, and a length of seat belt webbing 24 divided into a shoulder belt 26 and a lap belt 28. The lap belt 28 is anchored to the floor by a conventional anchor 30. The demarcation between the shoulder belt 26 and lap belt 28 is often defined by the tongue 32 which is inserted within a seat belt buckle 34 (also anchored by an appropriate anchor mechanism such as 30a). The shoulder belt 26 is supported by a web guide 90 which is part of a height adjuster 100 secured to a structural portion of the vehicle or to a frame of a seat. As is known in the art, the seat belt system can be incorporated within the back 44 of the seat or as illustrated exterior thereto.

Figure 2:
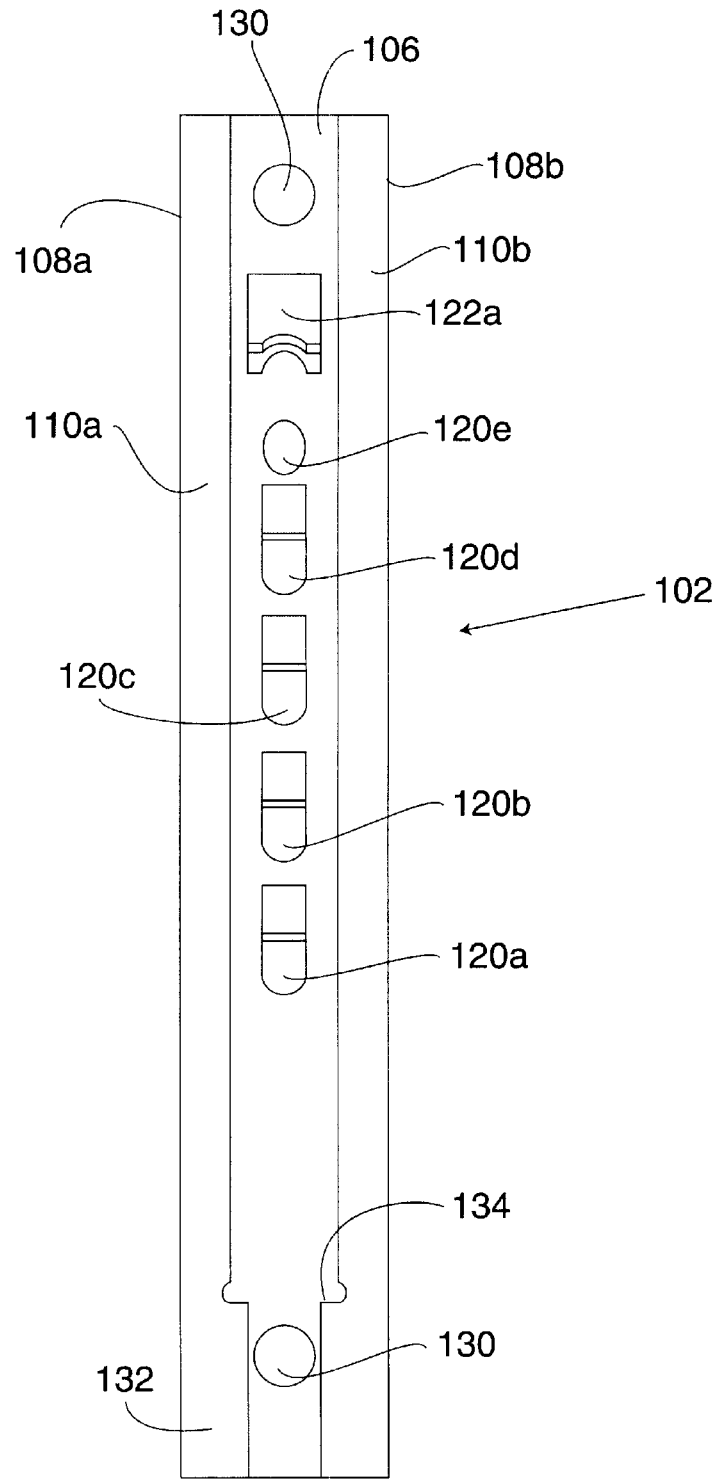
FIG. 2 is an isolated, plan front view of a track or rail.
Figure 3:
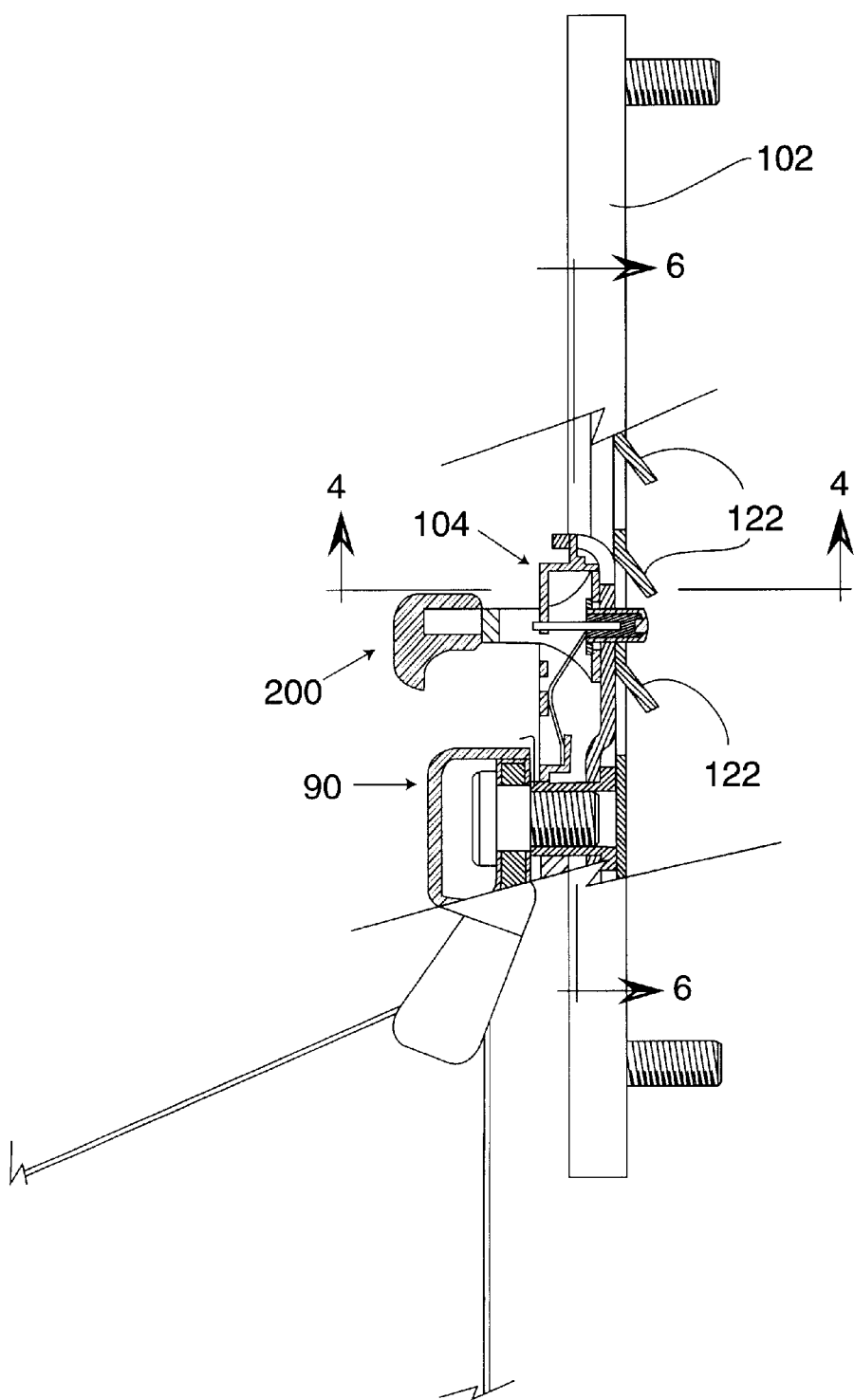
FIG. 3 is a cross-sectional view of the track and also shows a carrier thereon.
Figure 4:
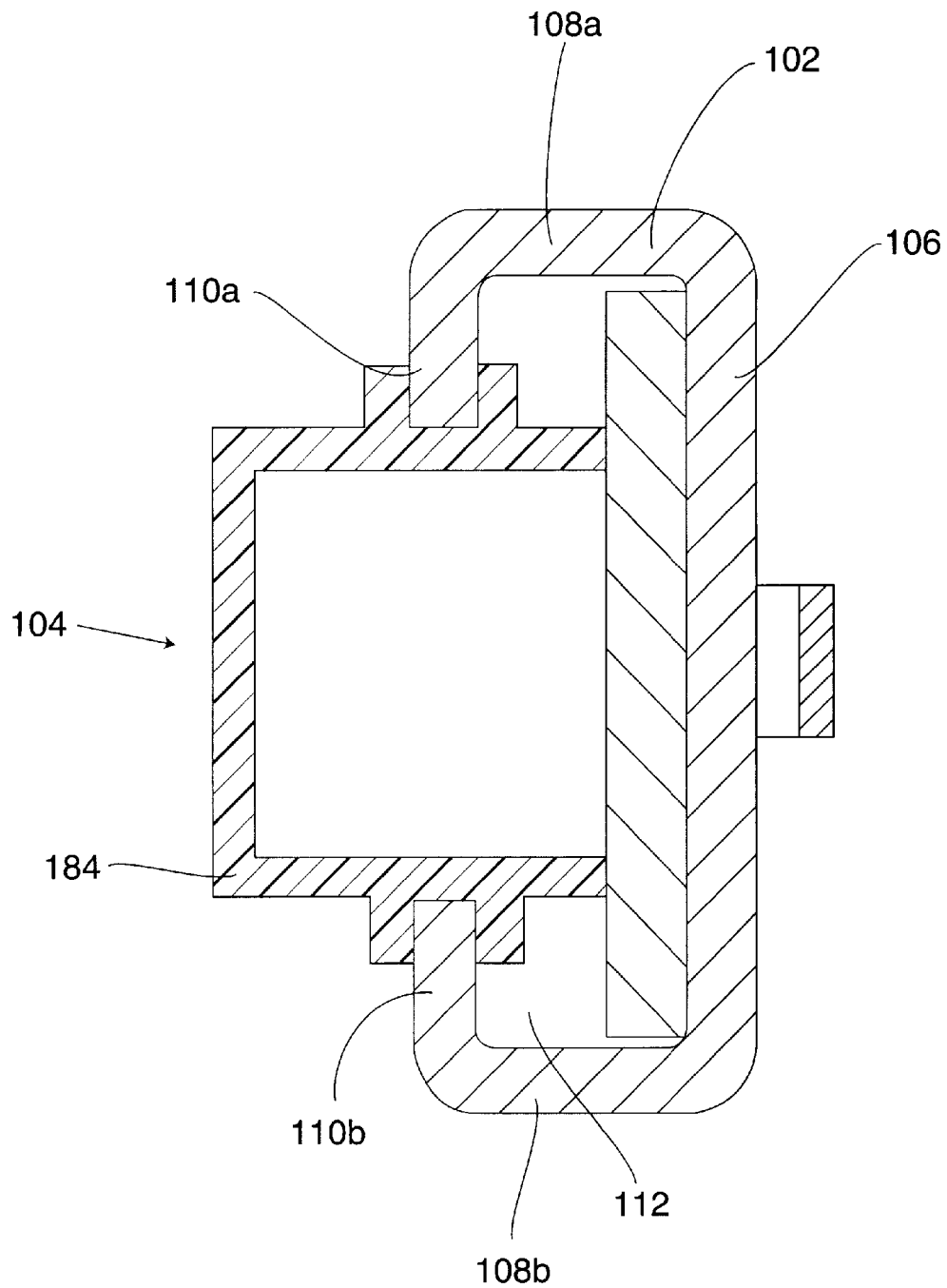
FIG. 4 is a cross-sectional view through section lines 4—4 of FIG. 3.

The height adjuster 100 comprises a track or rail 102 and a carrier or slide 104. The carrier is slidably positioned within or upon the track 102. FIG. 2 is an isolated front plan view of the track 102. FIG. 3 shows a cross-sectional view of the track 102 with the slide 104 positioned thereon. FIG. 4 is a cross-sectional view which shows both the cross-section of the track 102 and part of the slide 104. As can be seen, the track 102 comprises a rear member or plate 106 and sides 108a and 108b. Each side includes a respective front face 110a and lob forming a rectangular cavity 112 through which the carrier 104 can move. The rear plate 106 includes a plurality of adjustment holes 120a, 120b, 120c, 120d, and 120e. These holes 120a–120e are created such as by die punching a portion of the back plate 106 outwardly forming a plurality of angled surfaces 122 that are visible in FIG. 3. One such angle surface 122a is bent forwardly, after the carrier 104 is inserted in the track and functions as a stop. The rear plate 106 further includes mounting features 130 to permit the track 102 to be mounted to a structural member of the vehicle such as the B or C-pillar 40 or to the frame 42 of a vehicle seat shown in FIG. 1. While these mounting features 130 are shown as simple holes, other features such as a hook, can be formed at one or the other end of the track 102. The hook is received within a mating feature of the vehicle structure. As illustrated, the track 102 is bolted to the structural member by fasteners received through the openings 130. The lower portion of each front face 110a and 110b is wider near the bottom (see numeral 132) of the track 102. This construction provides a stop 134 limiting the downward motion of the carrier 104.

Figure 5:
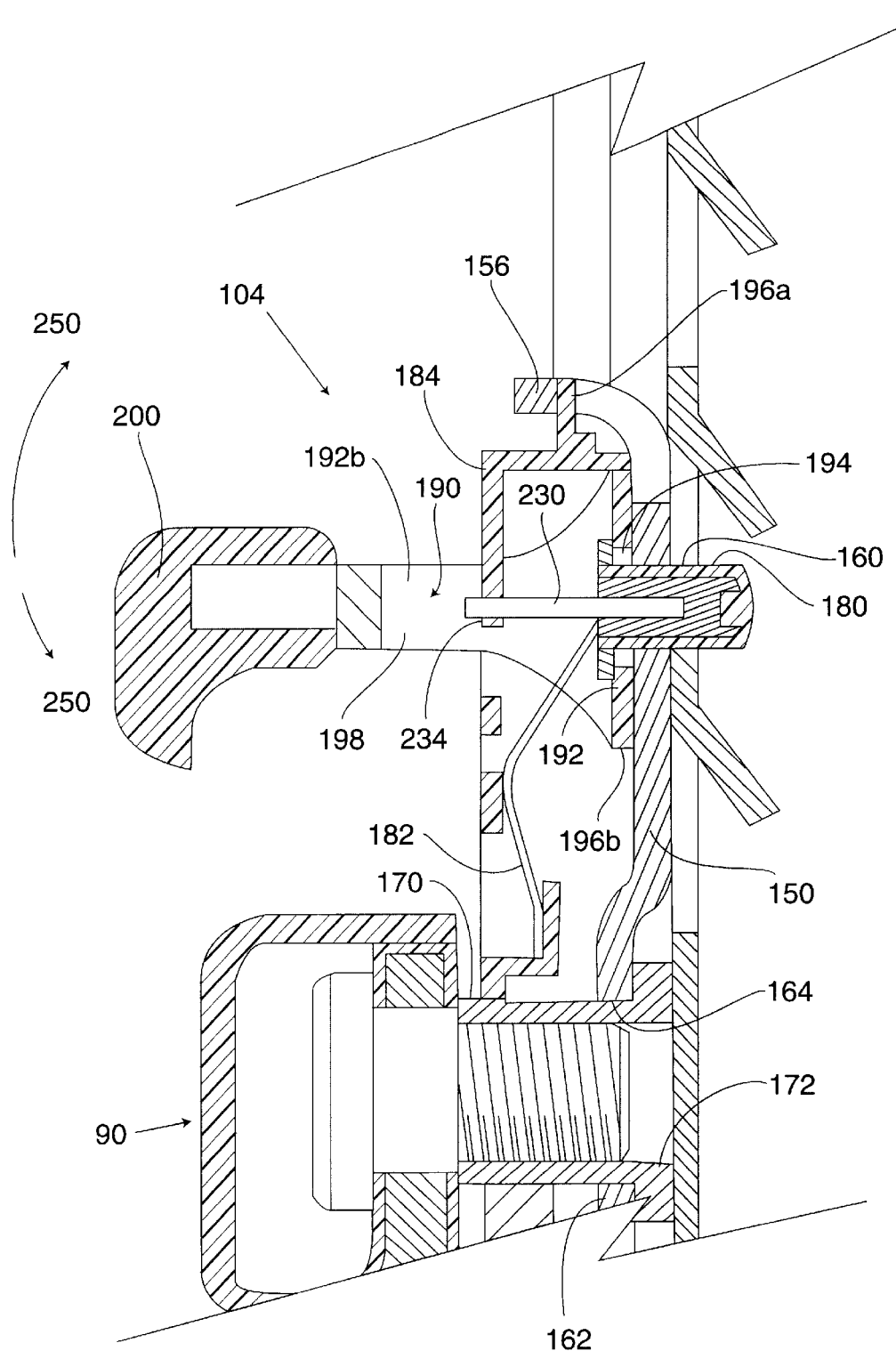
FIG. 5 is an enlarged view of a portion of FIG. 3.
Figure 6:
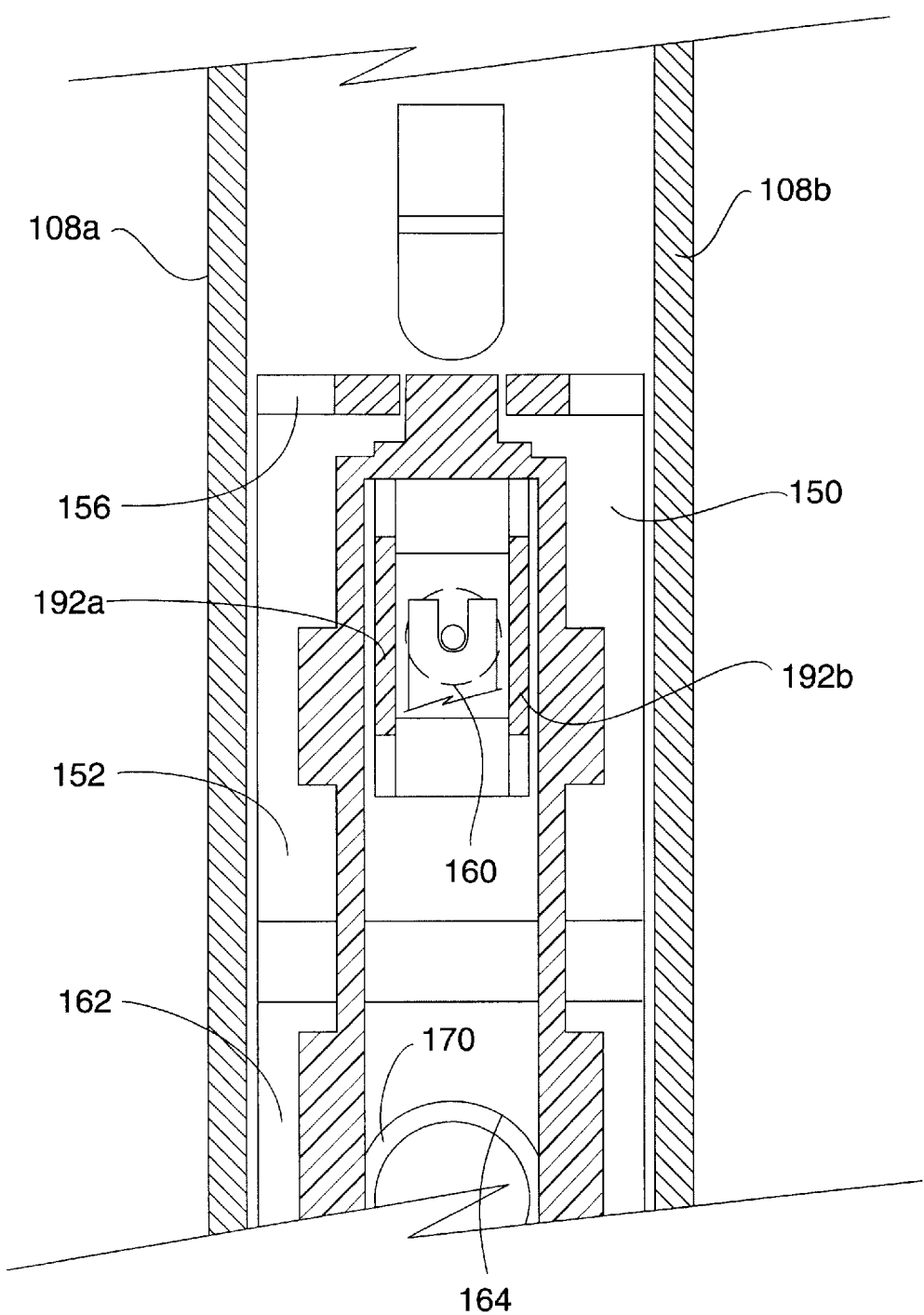
FIG. 6 is a cross-sectional view through section 6—6 of FIG. 3 of a plate, and part of the carrier.

Reference is also made to FIGS. 5 and 6, which are enlarged sectional views of the track 104. The carrier 104 comprises a metal plate 150. The center 152 of the plate 150 is substantially as wide as the distance across the sides 108a and 108b. A top or end 156 of the plate 150 is bent outwardly. The top 156 is dimensioned to fit within the space between the front faces 110a and b. The center portion 152 of the plate 150 includes a first opening 160. The lower end 162 of the plate includes a larger opening 164 into which is received a threaded bushing 170. The lower end 162, of the plate 150, is raised relative to the center portion 152 to accommodate the bushing flange 172 shown in FIG. 5. The D-ring 102, of conventional design, is threadably secured to the bushing 170.

The carrier 104 additionally includes a spring biased, lock pin 180 that is slidably received within the opening 160. The pin 180 is biased outwardly, to a locking or engaged position, by a spring, such a leaf spring 182, secured to a top cover 184 of the carrier. The lock pin 180 is positioned within a holding or pivot member 190. The holding or pivot member 190 includes an end plate 192, having an opening 194 therein and side plates 192a,b which form a generally tubular body portion 198 that extends outwardly from the cover 184 and is secured to a manually movable knob or handle 200. The knob 200, holding member 190 and pin 180 are each movable relative to the plate 150 and to the track 102. The holding member 190 and lock pin 180 are connected by an alignment pin 230.

Figure 7A:
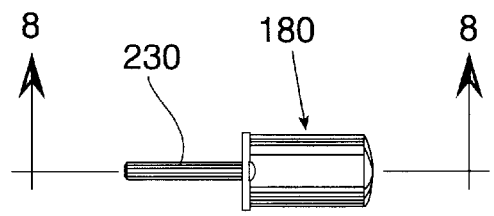
FIGS. 7A–7C respectively show a top, front and side view of a lock pin.
Figure 7B:
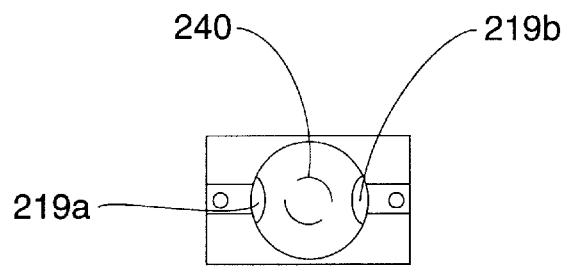
Figure 7C:
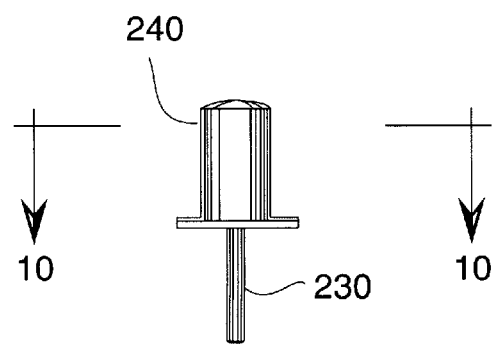
Figure 8:
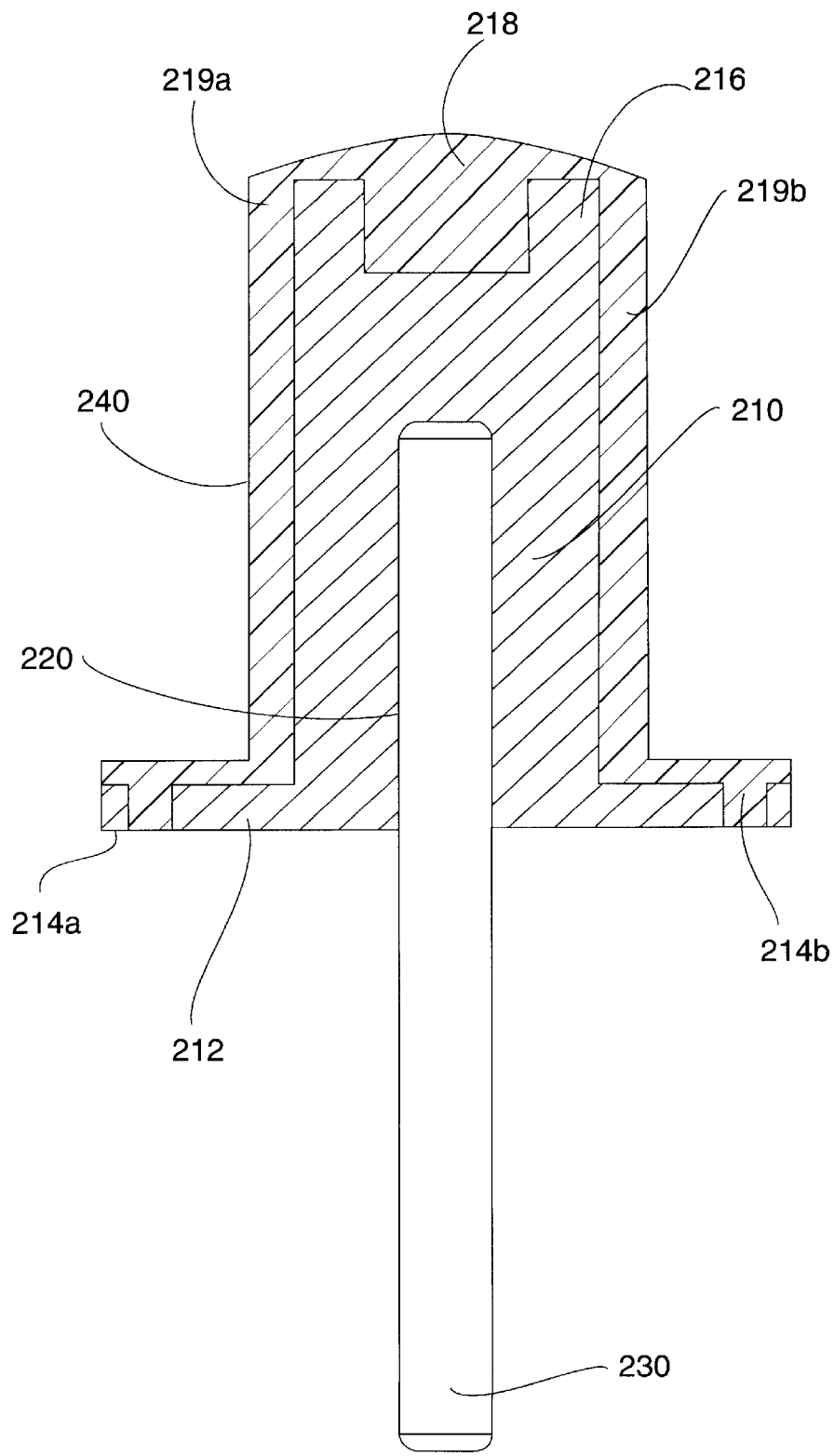
FIG. 8 is a cross-sectional view through section 8—8 of FIG. 7A of a lock pin.
Figure 9:
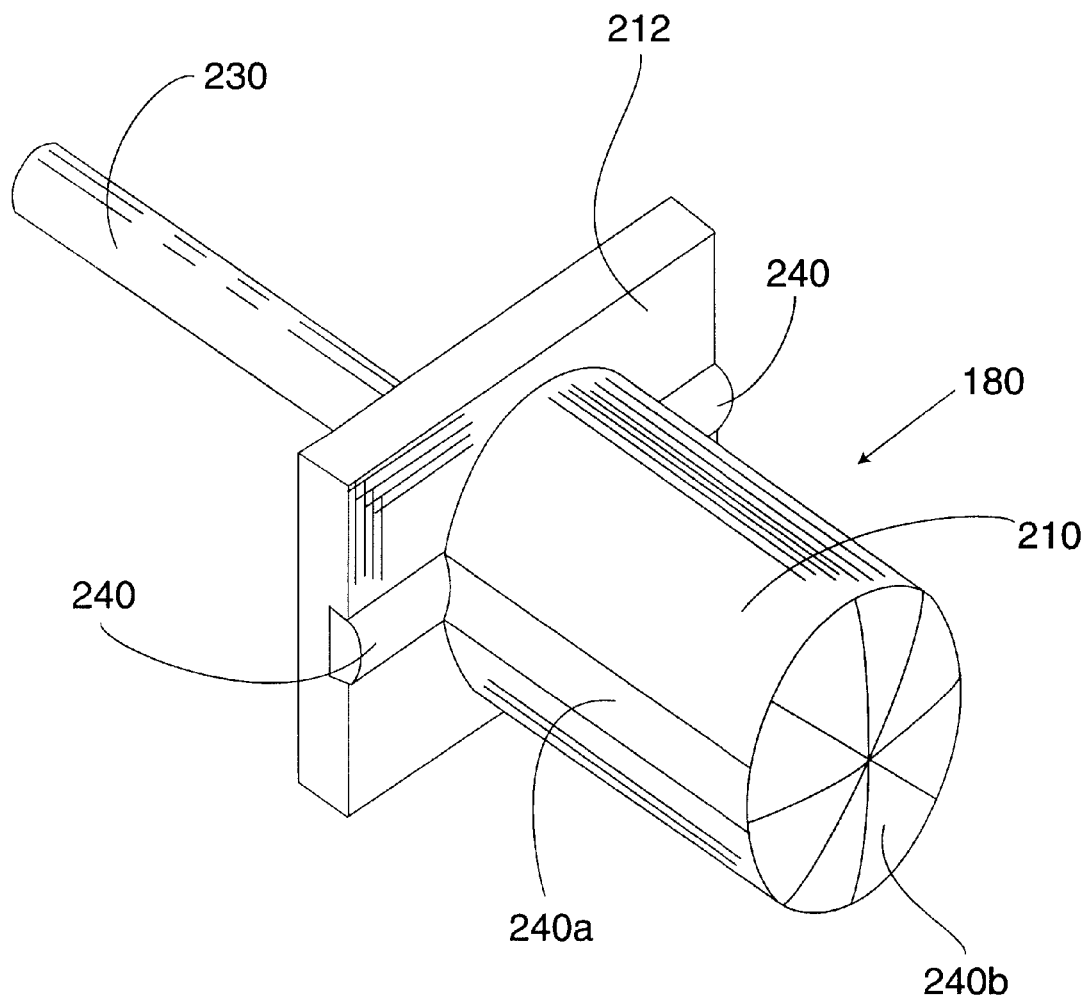
FIG. 9 is an isometric view of the lock pin.
Figure 11:
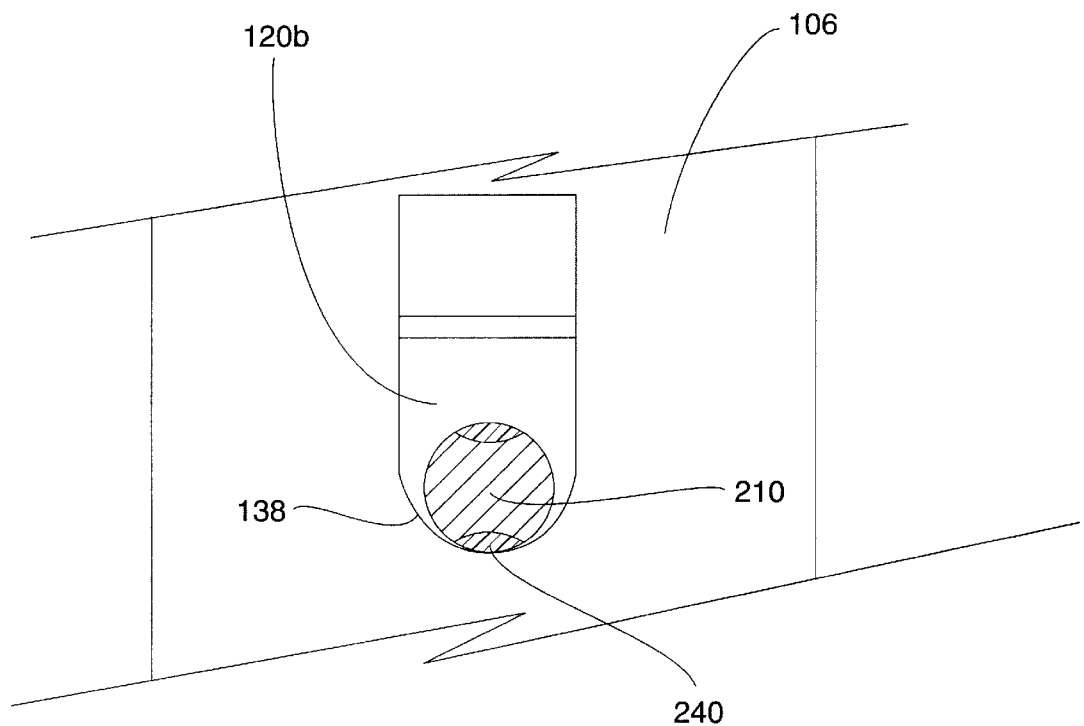
FIG. 11 is a partial sectional view showing the relationship of a pin within a lock hole.

Reference is briefly made to FIGS. 7A–7C which respectively illustrate top, front and side plan views of the lock pin 180. FIG. 8 is a cross-sectional view of the pin through Section 8—8 of FIG. 7A. The lock pin 180 comprises a metal, cylindrically shaped body 210 and a flange 212. The body and flange can be formed as a cold headed part, sintered metal, die cast or machined. The flange includes small openings 214a and 214b that can be holes, grooves, or slots. The front end 216 of body 210 includes a cylindrical recess, slot or pin (not shown) 218. The top and bottom of the body further includes a respective groove 219a,b which runs the length thereof. The flange and the body 210 include a bore 220 to receive the alignment pin 230. Part of the body 210 and part of the flange 212 support a layer of energy-absorbing material 240 that extends across the flange and runs the length of the body 210, fills the openings 214a,b and covers and extends from the recess 218 to form a tip or nose of the lock pin. The energy absorbing material should be a low durometer, lubricous material such as rubber, plastic or other elastomer. As can be appreciated, the material 240 provides a low friction surface relative to the lock openings 120a–e, and cushions the impact of the pin 180 with the track 102 thereby reducing noise. Rubber, polypropylene, hytrel, nylon, or other similar material can be used. The orientation of the material 240 relative to the body and flange is also shown in FIG. 9. As can be seen in FIG. 11, the energy absorbing material 240a within the grooves 219a,b, preferably, does not extend beyond the radius of the body 210. Alternately, the material 240a can be domed or raised relative to the body. To insure that the material 240a (in the grooves), rather than the body contacts the track 102, each lock hole 122a–e is larger than the lock pin. More particularly, the diameter of the lock hole is over sized so that the pin 180 properly installed in the carrier 104, the lower edge 138 of the lock hole is tangent to the material 240, and extends outwardly therefrom, thereby minimizing hole-to-pin contact on the metal (uncoated) sides of the pin. Further the depth of the grooves 219a,b is chosen to provide a sufficient depth of material 240 to prevent the pin from contacting the track 102 as the material is compressed. As can also be seen the material 240 is also formed into a domed surface 240b, at the tip of the pin 180. This provides for a low friction surface that contacts the angled rail surfaces 122 as the carrier is moved upwardly reducing friction and wear and reducing noise.

Reference is again made to FIGS. 3 and 5. As can be seen, the alignment pin 230 extends through an opening 234 in the housing cover 184. This construction, in cooperation with the opening 160, prevents the pin 180 from cocking when moved outwardly by the handle or knob 200 and holding or pivot member 190 when pivoted in either direction of 250.

When the occupant desires to change vertical orientation of the D-ring 90, the handle or knob 200 is moved downwardly or upwardly as shown by arrows 250. This action causes the holding member 190 to pivot either downwardly or upwardly at its respective corners 196a and b. The pivoting of the holding member 190 urges the plate 192 against the flange 212, and pulls the lock pin 180 out of the previously selected lock opening such as 120c. Thereafter, the carrier can be moved upwardly or downwardly by the occupant to another position along the track. With the slide in the new position, the handle 200 is released and the spring 182 biases the lock pin 180 toward the rear plate 106 into the newly selected opening 120a, 120b, 120d or 120e. If the lock pin does not automatically enter the selected opening any slight movement of the carrier 104 will permit the lock pin 180 to become aligned with the selected lock opening.

Figure 10A:
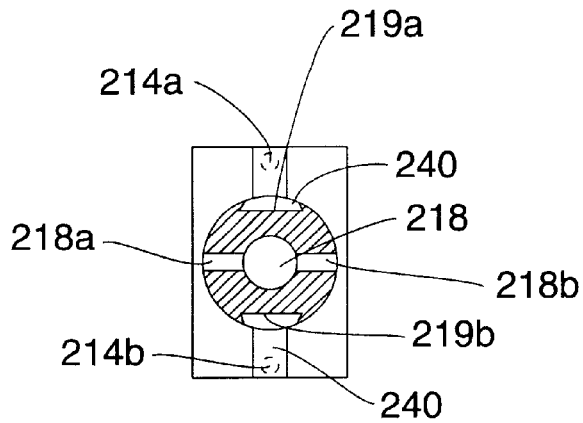
FIGS. 10A–10C are cross-sectional views through section 10—10 of FIG. 7C respectively showing various embodiments of lock pin.
Figure 10B:
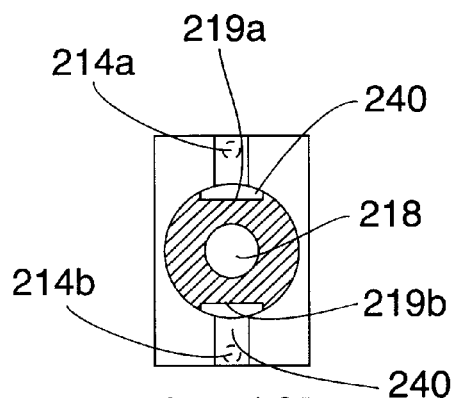
Figure 10C:
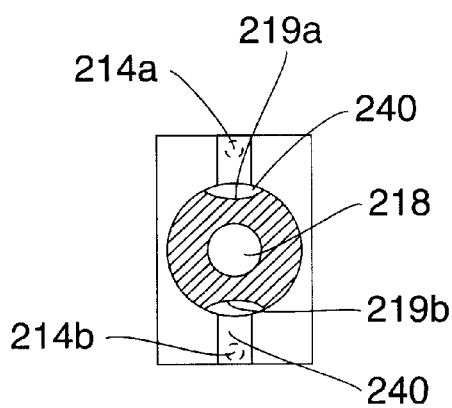

Reference is briefly made to FIGS. 10A–10C. FIG. 10A shows an alternate shape for grooves 219a and 219b. In this case each groove includes an undercut that serves to assist in holding the material 240 to the body 210. FIG. 10A also shows a modified recess 218 having winged portions 218a. FIG. 10B shows grooves with rectangularly shaped internal corners. FIG. 10C is a front cross-sectional view of the pin configuration of FIG. 7C.

While a lock pin having a generally circular, cylindrical body has been shown other shapes such as a rectangular or triangular body can be used. As can be appreciated, the present invention can be used in other ways such as part of a vehicle seat adjuster permitting fore and aft movement of the seat. In this manner carriers can be secured to a seat frame portion located on the underside on each side of the seat. The carrier is slidably received within a corresponding track fixed to the floor of the vehicle. With the pins disengaged from the track the occupant can slide the seat to a new position and lock it in place.

Many changes and modifications in the above-described embodiment of the invention can, of course, be carried out without departing from the scope thereof. Accordingly, that scope is intended to be limited only by the scope of the appended claims.

What is claimed is:

1. An adjuster mechanism (100) comprising:
    a track (102) adapted to be mounted to a structural member of a vehicle, the track including a plurality of adjustment holes (120a–e) located along its length,
    a carrier (104), manually movable along the track relative to the adjustment holes, the carrier supporting a movable, lock pin (180), the pin movable from a first position in which the pin is disengaged from a selected adjustment hole to a second position in which the pin is located within, another selected adjustment hole, a spring (182) for biasing the pin in a direction toward the adjustment holes and an activating member (200) operatively connected to the pin for moving the pin out of a hole;
    a thin rib of energy absorbing material (240) secured to and extending radially outward from the pin, to prevent the pin from contacting an adjacent portion of the track proximate an adjustment hole.

2. The adjuster as defined in claim 1 including a web guide (90) adapted to receive the seat belt, mounted to and movable with the carrier.

3. The adjuster is defined in claim 1 wherein the material also extends across a face of the lock pin.

4. The height adjuster as defined in claim 1 wherein the pin has a top and bottom, and a respective groove in the top and bottom, and wherein part of the energy absorbing material is situated in the grooves.

5. The height adjuster as defined in claim 4 wherein the pin includes a flange and a cylindrical pin member extending outwardly therefrom, the pin member including the grooves.

6. The height adjuster as defined in claim 5 wherein the flange includes a rib of energy absorbing material.

7. The height adjuster as defined in claim 6 wherein the rib on the flange and the rib on the cylindrical member are integral to each other.

8. The height adjuster as defined in claim 7 wherein the carrier further includes a plate having a pin opening, wherein the pin extends through the pin opening, and wherein the flange is located on an interior side of the plate.

* * * * *